United States Patent [19]
Jakeman et al.

[11] Patent Number: 5,358,269
[45] Date of Patent: Oct. 25, 1994

[54] TRAILER HITCH

[76] Inventors: Walter L. Jakeman, 776 William Way, Salt Lake City, Utah 84107; Steven R. Warburton, 1869 Yuma St., Salt Lake City, Utah 84108

[21] Appl. No.: 112,933

[22] Filed: Aug. 30, 1993

[51] Int. Cl.$^5$ .............................................. B60D 1/06
[52] U.S. Cl. ............................ 280/490.1; 280/415.1; 280/505
[58] Field of Search ............... 280/490.1, 415.1, 416.1, 280/504, 505

[56] References Cited

U.S. PATENT DOCUMENTS

| | | | |
|---|---|---|---|
| 2,872,213 | 2/1959 | Hosford | 280/416.1 |
| 3,400,949 | 9/1968 | Kendall | 280/490.1 |
| 4,157,189 | 6/1979 | Poley | 280/490.1 |
| 4,280,713 | 7/1981 | Bruhn | 280/490.1 |

*Primary Examiner*—Mitchell J. Hill
*Attorney, Agent, or Firm*—M. Ralph Shaffer

[57] ABSTRACT

A trailer hitch for securement to the medial step portion of the rear bumper of a towing vehicle such as a pickup truck; the trailer hitch includes a mount member which is mounted and also keyed against rotation to the step of the bumper; structure is provided for coupling a ball hitch to the mount in a manner that the same is adjustable for ball height as well as effecting detachment of the ball and its associated structure from the support mount affixed to the bumper.

12 Claims, 3 Drawing Sheets

U.S. Patent    Oct. 25, 1994    Sheet 1 of 3    5,358,269
BEST AVAILABLE COPY
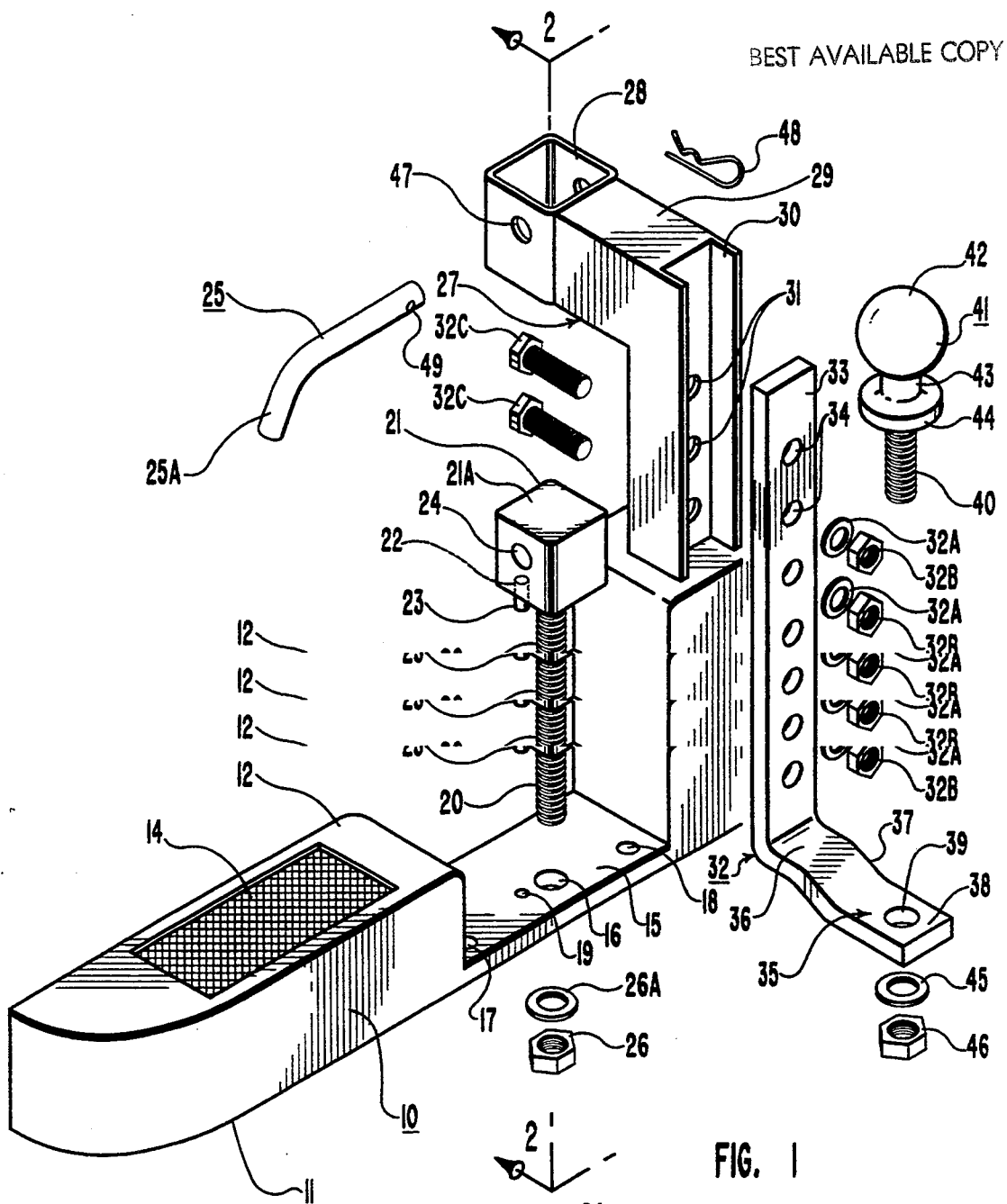
FIG. 1
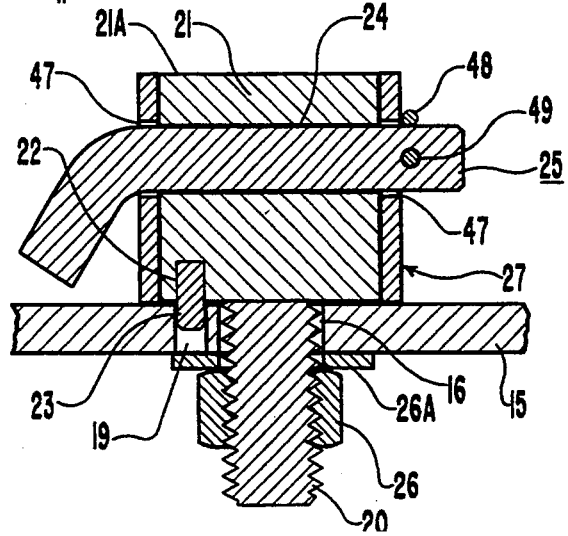

TRAILER HITCH

FIELD OF INVENTION

The present invention relates to tailer hitches and, more particularly, to a new and improved trailer hitch which can be conveniently mounted to the medial step portion of the bumper of a pickup truck, for example. The ball of the hitch is adjustable for vertical orientation and is also reversible, this for a wide range of connections to the ball socket of a trailer to be towed. Structural members are provided for effecting the adjustable and reversible feature, as above pointed out, as well as for providing a convenient attachment and detachment feature of a principal portion of the hitch relative to its mount that is affixed to the medial step of the bumper of the vehicle.

BRIEF DESCRIPTION OF PRIOR ART

In the past, vehicles such as pickup trucks are provided with bumpers, some of which incorporate a hitch of some type. Principally, however, the usual procedure is to provide an elongated bar beneath the bumper which serves as an attachment for the hitch mechanism which is utilized to tow a boat trailer and the like. The manufacture of the elongate bar with its associated structure, or alternate structure utilized for a direct attachment to the axle of the vehicle, is very expensive and awkward to use.

Where the ball of the ball-socket structure is directly fixed to the vehicle step, then there remains the problem of height adjustment which in the present art is believed not accommodated. Further, there needs to be an offset, for variable-height adjustment, relative to the structure supporting the ball and the mounting to the step of the bumper. This likewise is not known by the inventors to exist in the prior art. The feature of height adjustment is very important so as to accommodate a variety of trailers to be towed. Also, it would be advantageous to have a hitch mount secured and in some way keyed against rotation relative to the medial step portion of the bumper. No patent art is known to the inventors which is believed directly in point as to the invention as set forth herein.

BRIEF DESCRIPTION OF INVENTION

Accordingly, in the present invention, the medial step of the rear bumper of a vehicle is provided with an aperture for receiving a hitch mount member. The step also incorporates a pair of safety chain apertures useful for receiving the hooks at the forward ends of the representative trailer's safety chains customarily provided near the front of the trailer. A mount member includes a depending, vertically oriented thread shaft portion which proceeds through the mounting aperture of the bumper and is locked in place by a washer and nut, for example. Importantly, the mount member also preferably includes an offset pin which is directed into a corresponding secondary hole or aperture in the step. This is but one way to lock the mount member in place against rotation about a vertical axis. The mount member is likewise preferably not circular, but is preferably rectangular or square in horizonal cross section. The mount member cooperates with and receives a mount receptacle of preferably corresponding non-circular nature which is selectively keyed thereto. Structure provides for coupling of the mount receptacle to a carrier, the latter generally taking the form of a channel mount. A support member includes an upwardly extending support portion received by the channel, and both are provided with a series of apertures that can be mutually selected in accordance with the height adjustment needed for the ball and hitch. Attachments are suitably provided. The lower extremity of the support member is provided with a rearwardly extending tongue integral with the vertical support portion, and the tongue includes an aperture receiving a ball mount which is secured thereto.

The structure of the invention is designed with a reversible feature such that that portion of the structure including the tongue can be inverted so as to raise the tongue above the mount receptacle of associated structure. Whether the tongue is inverted to the upside or has its downside configurement, a suitable series of apertures are provided the support portion and its mount so that a selection of holes with nut and bolt attachments can effect a vertical adjustment feature.

When the primary structure of the hitch is to be removed from the bumper, then the mount receptacle can simply be unkeyed and slipped off the mount member fixed to the step.

OBJECTS

Accordingly, a principal object of the present invention is to provide a new and improved ball hitch structure for towing vehicles such as pickup trucks.

A further object is to provide a trailer hitch wherein the ball connector portion thereof can be adjusted heightwise, and, further, wherein the supporting structure of the ball hitch can be made reversible end for end and also adjustable, whether in the normal or in reversed condition.

An additional object is to provide a trailer hitch wherein the mount member thereof attachable to the step of a bumper of a towing vehicle is keyed thereto against rotation, and with such mount member having a non-circular horizontally transverse cross-section so that there can be a reception of a mount receptacle, similarly non-circular, this to provide against inadvertent rotational displacement of the hitch about a vertical axis.

An additional object is to provide a trailer hitch structure that can be easily attached to and removed from the rear bumper of a towing vehicle.

DRAWINGS

The features of the present invention, together with further objects and advantages thereof, may best be understood by reference to the following detailed description taken in connection with the accompanying drawings in which:

FIG. 1 is an exploded perspective view of the trailer hitch structure of the invention, in a preferred embodiment thereof, illustrating connection thereof to the step portion of the rear bumper of the towing vehicle such as a pickup truck.

FIG. 2 is an enlarged, fragmentary, sectional detail taken along the line 2—2 in FIG. 1, illustrating a portion of the structure when assembled, and showing in particular the assembly and installation of the mount member employed.

DETAILED DESCRIPTION OF PREFERRED EMBODIMENTS

Figure 3:
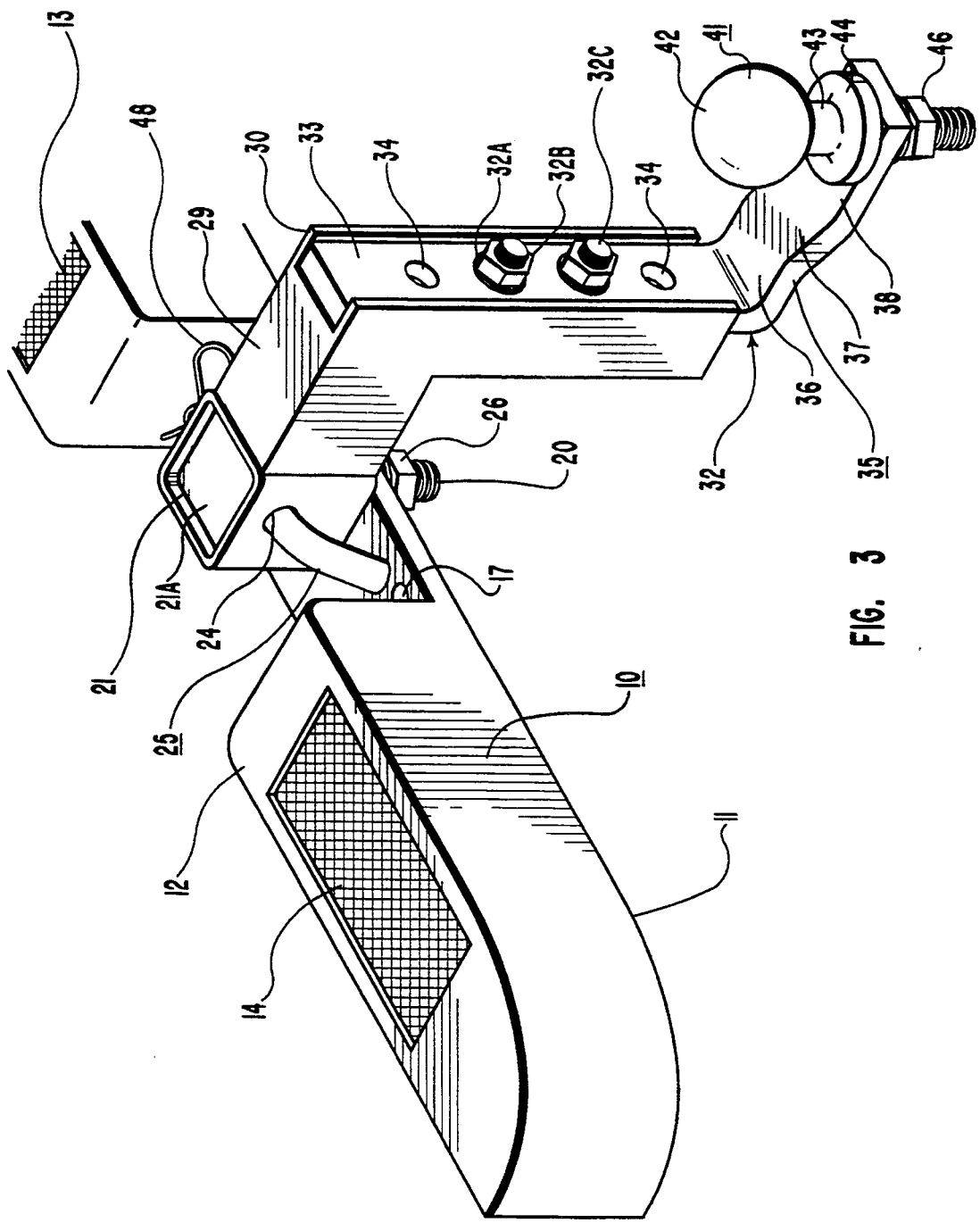
FIG. 3 is a fragmentary perspective view of the structure of FIG. 1 when assembled.

In FIGS. 1-3 rear bumper 10 of a towing vehicle includes right and left raised bumper portions 11 and 12 each provided with friction pads 13 and 14, respectively. Joining the raise bumper portions 11 and 12 is a medial step 15, the same being provided with ball mount aperture 16 and also safety chain hook apertures 17 and 18. The latter are customarily provided a vehicle. An offset hole or aperture 19 comprises a pin receiving aperture. The same may proceed completely through the medial step 15 or may simply serve as a pin receiving indentation. In any event, threaded stub shaft 20 proceeds through aperture 16. Shaft 20 is a depending part of mount member 21. The principal portion 21A of mount member 21 is non-circular at its transverse horizontal cross-section, for purposes which will be explained hereinafter. At this point it is important to note that a vertical pin aperture 22 is provided and receives a roll pin or other type of pin 23 which is pressed or otherwise secured into the hole to constitute an component part of mount member 21. The pin 23 is aligned with aperture 19 and proceeds therein when the mount member 21 is secured at aperture 16 to the medial step 15 by the provision of nut and washer attachments 26 and 26A.

Principal member 27 includes a mount receptacle 28 that is dimensioned to be slipped over and retained by mount member 21. Integral with mount receptacle 28 is an intermediate portion 29 that carries elongate carrier 30. The entire principal member 27, i.e. 28, 29 and 30, may be made as integral welded structure, by way of example. Elongate, preferably channel-configured carrier 30 of principal member 27 includes a series of apertures 31 accommodating attachments such as bolts 32C and lock washers and nuts 32A and 32B, respectively. Support member 32, part of a hitch ball connector structure that also includes ball connector 41, includes an upstanding elongate support portion 33 provided with a corresponding series of apertures 34. The lower portion of the elongate support 33 is made integral with a tongue 35. Tongue 35, having a dog-let type of configurement as seen in FIG. 1 includes a front portion 36, an intermediate portion 37, and also a rear portion 38. Rear portion 38 includes an aperture 39 for receiving the threaded shaft portion 40 of ball connector 41. Ball connector 41 includes ball portion 42, riser portion 43 integral therewith, and an intermediate flange portion 44 as seen. Washer and nut attachments 45 and 46 secure the threaded shaft portion 40 to rear portion 38 once shaft portion 40 is positioned into and descends through aperture 39. When the mount receptacle 28 is positioned over the mount member 21, then pin member 25 having a leftward bent retainer end as seen, proceeds through aligned apertures 24, 47, and the pin member 25 is secured in place by lock pin 48 proceeding through lock pin aperture 49 of pin 25. Head 25A of pin 25 is, e. g., bent to provide retention.

In assembly, the stub shaft or shaft portion 20 of mount member 21 is positioned through aperture 16 such that pin 23 engages and descends into aperture 19. Again, aperture 19 need only proceed vertically partway through the step. In any event, washer 25 and nut 26 effect the securement, disposed at threaded shaft portion 20 of the mount member 21 to the medial step 15.

Subsequent to this operation, the mount receptacle 28 is positioned and dropped in registry over the mount member 21, and the elongate carrier 30 proceeds in an offset manner to the rear of the rear edge of the bumper. Either before or after the mounting of the mount receptacle, attachments 32A, 32B and 32C may be employed at the selected ones of apertures 31, 34 so that a proper height relationship exists as between elongate carrier 30 and elongated support portion 33. It is apparent from the drawing that the inter-engagement and securement of the structure at 29, 30 with support member 32 can be accomplished prior to the downward insertion of mount receptacle 28 over mount member 21.

Subsequent to the inter-engagement of support member 32 of principal member 27, the receptacle 28 is simply slipped over mount member 21 and the two are secured together by pin member 25 acting with locking pin 48. The ball connector 41 is of course mounted to the rear portion 38 of the tongue 35 by washer and nut attachments 45 and 46.

Again, tongue 35 is adjustable as to height by virtue of the selection of different apertures 31 and 34. And the associated securement as to chosen relative positioning between the elongate or elongated support portion 33 and elongate carrier 30 is selected through the employment of the nut and bolt attachments as at 32 at the particular apertures selected.

Figure 4:
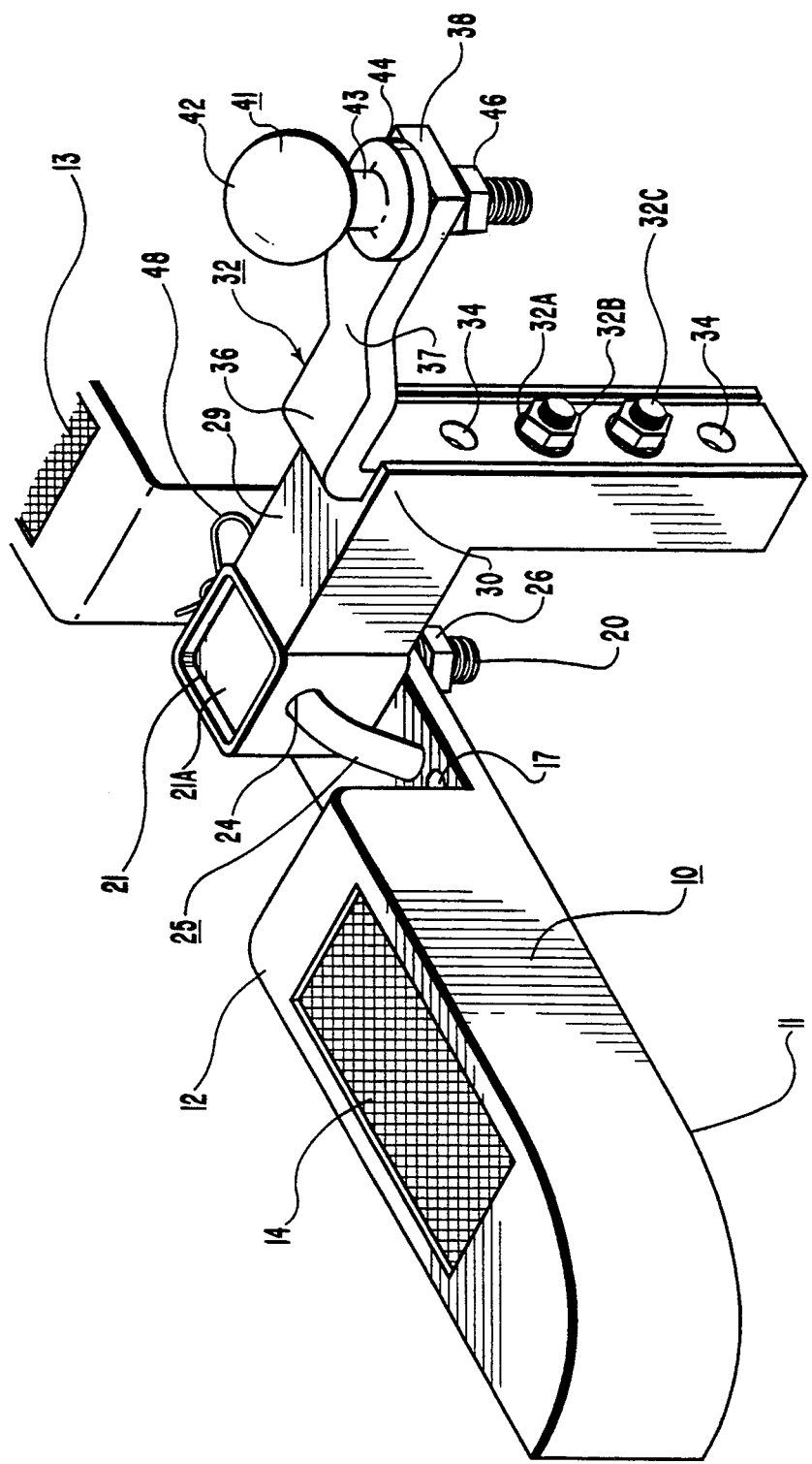
FIG. 4 is similar to FIG. 3 but illustrates an inversion of that member utilizing the ball connector, this to raise effectively and adjustably the height of the ball for optimal coupling purposes for certain types of trailers requiring an elevated ball-hitch coupling feature.

If in the condition shown in FIG. 1 the height of the ball is still not sufficient for the particular type of carrier being accommodated, then the support member 32 can be inverted end-for-end, see FIG. 4, and the ball likewise mounted in the reverse direction through aperture 39 in a manner as shown in FIG. 4, such that a higher height can be achieved and maintained by ball connector 31. At such elevation there is still further adjustment through the judicious selection as to apertures 31, 34 with the bolt, washer and nut attachments 32A-32C, etc.

The operation of both embodiments in FIGS. 3 and 4 is essentially the same, with ball connector 41 being available now to receive the forward ball-socket of that trailer to be towed. When the trailer is disconnected from the ball, then the principal portion of the hitch can be removed and stored, simply by releasing lock pin 48, removing pin 25, and lifting the receptacle 28 free from engagement with mount member 21.

While the particular embodiments of the present invention have been shown and described, it will be obvious to those skilled in the art that various changes and modifications may be made without departing from the central aspects of the invention and, therefore, the aim in the appended claim is to recover all such modifications that fall within the true spirit and scope of the invention.

We claim:

1. A trailer hitch including, in combination, a mount member for securement to an external rear bumper of a towing vehicle; a principal member comprising a forward mount receptacle receiving as a socket said mount member, an intermediate portion integral with said mount receptacle, and a rearward, vertical elongate carrier joined to said intermediate portion and provided with a first series of mutually vertically spaced apertures; means for releasably securing said mount member to said mount receptacle; a support member having a vertically upstanding, elongate support portion provided with a second series of mutually vertically spaced apertures dimensioned for selective registry with said first series of mutually vertically spaced apertures, and a rearwardly, essentially horizontally extending tongue integral with said support portion, said tongue being provided with a mounting aperture; a ball connector having a threaded shaft portion disposed in said mounting aperture, a flange portion above and integral with said threaded shaft portion, and a connector ball provided with a depending riser integral with said flange portion; nut means threadedly engaging said threaded shaft portion of said ball connector for releasably securing said ball connector to said tongue; and a series of attachments securing said elongate support portion to said elongate carrier at selected ones of said first and second series of apertures.

2. The trailer hitch of claim 1 wherein said mount member has a non-circular horizontal cross-section.

3. The trailer hitch of claim 1 wherein said mount member has a depending pin and also a depending threaded shaft portion horizontally spaced from said pin, both said pin and said threaded shaft portion being dimensioned to engage respective apertures in an external bumper, and nut means threaded onto said shaft portion of said mount member.

4. The trailer hitch of claim 1 wherein said mount member and said forward mount receptacle have essentially matching horizontal cross-sections respectively mutually cooperating in a socket relationship.

5. The trailer hitch of claim 1 wherein said releasably securing means comprises a pin member provided with a retainer end at one extremity and a locking pin aperture at the remaining extremity, and a locking pin releasably disposed in said locking pin aperture, said mount receptacle and said mount member each having mutually aligned apertures releasably receiving said pin member.

6. The trailer hitch of claim 1 wherein said tongue has a dog-leg type of configuration, in its vertical longitudinal cross section, relative to its extension rearwardly relative to said elongate support portion.

7. The trailer hitch of claim 1 wherein said elongate carrier of said principal member takes the form of a vertical channel, said elongate support portion of said support member being disposed in said channel and being dimensioned to be selectively reversible end-for-end for positionment in said channel, said ball connector being selectively mounted to said tongue such that said flange engages a selected one of the opposite sides of said tongue.

8. In combination, a towing vehicle rear bumper; and a trailer hitch comprising a mount member secured to said rear bumper; a principal member comprising a forward mount receptacle receiving as a socket said mount member, an intermediate portion integral with said mount receptacle, and a rearward, vertical elongate carrier joined to said intermediate portion and provided with a first series of mutually vertically spaced apertures; means for releasably securing said mount member to said mount receptacle; a support member having a vertically upstanding, elongate support portion provided with a second series of mutually vertically spaced apertures dimensioned for selective registry with said first series of mutually vertically spaced apertures, and a rearwardly, essentially horizontally extending tongue integral with said support portion, said tongue being provided with a mounting aperture; a ball connector having a threaded shaft portion disposed in said mounting aperture, a flange portion above and integral with said threaded shaft portion, and a connector ball provided with a depending riser integral with said flange portion; nut means threadedly engaging said threaded shaft portion of said ball connector for releasably securing said ball connector to said tongue rearwardly of said bumper; and a series of attachments securing said elongate support portion to said elongate carrier at selected ones of said first and second series of apertures.

9. In combination: a rear bumper of a towing vehicle; and a hitch having: mount member secured to said rear bumper and provided with means for preventing inadvertent rotation of said mount member relative to said rear bumper; a socket receptacle positioned over and releasably secured to said mount member; an upstanding carrier integral with and disposed rearwardly of said receptacle and provided with a first series of apertures; a support member having an upstanding elongate support portion, provided with a second series of apertures selectively matching said first series of apertures, and a tongue essentially horizontally rearwardly extending from and integral with said upstanding elongate support portion, said support member being selectively reversibly mounted to said upstanding carrier; attachment means passing through selected ones of said first and second series of apertures for mounting said support member to said upstanding carrier; and a ball connector upstandingly secured to said tongue.

10. In combination: a rear vehicle bumper having a medial lowered step provided with a vertical mount aperture; first means secured at said mount aperture and coupled to and secured against rotation with respect to said step, for supplying a mount; second means vertically telescoping over and releasably secured to said first means for securing additional structure to said first means; and hitch ball connector structure comprising said additional structure and provided with a ball connector and also adjustable means structurally interposed and connected to and between said ball connector and said second means for securing said ball connector to said second means and for selectively varying the height of said ball connector relative to said step.

11. In combination: a rear vehicle bumper having a medial lowered step provided with a vertical mount aperture; first means, secured at said mount aperture and coupled to and secured against rotation with respect to said step, for supplying a mount; second means vertically telescoping over and releasably secured to said first means for securing additional structure to said first means; and hitch ball connector structure comprising said additional structure and provided with a ball connector and also adjustable means structurally interposed and connected to and between said ball connector and said second means for securing said ball connector to said second means and for selectively varying the height of said ball connector relative to said step, and wherein said step has an offset aperture relative to said vertical mount aperture, said first means including a pin disposed in said offset aperture.

12. In combination: a rear vehicle bumper having a medial lowered step provided with a vertical mount aperture; first means, secured at said mount aperture and coupled to and secured against rotation with respect to said step, for supplying a mount; second means vertically telescoping over and releasably secured to said first means for securing additional structure to said first means; and hitch ball connector structure comprising said additional structure and provided with a ball connector and also adjustable means structurally interposed and connected to and between said ball connector and said second means for securing said ball connector to said second means and for selectively varying the height of said ball connector relative to said step, and wherein said first and second means have cooperatively aligned apertures and are provided with an intercooperative, removable, intercoupling pin, removably positioned in said apertures, and wherein said adjustable means includes two cooperative vertical elongate members provided with respective sets of apertures and cooperative attachments adjustably securing said elongate members together, one of said elongate members being mutually reversible end-for-end, and one of said elongate members having a rearwardly extending tongue, having two opposite sides, and provided a mounting aperture extending through said opposite sides and accommodating the mounting of said ball connector on a selected one of said two opposite sides of said tongue.

* * * * *